(12) United States Patent
Choi et al.

(10) Patent No.: US 9,223,171 B2
(45) Date of Patent: Dec. 29, 2015

(54) POLARIZER, METHOD OF MANUFACTURING THE POLARIZER, DISPLAY PANEL HAVING THE POLARIZER AND DISPLAY APPARATUS HAVING THE DISPLAY PANEL

(71) Applicant: SAMSUNG DISPLAY CO., LTD., Yongin, Gyeonggi-Do (KR)

(72) Inventors: Sang-Gun Choi, Suwon-si (KR); Woo-Yong Sung, Seoul (KR); Tae-Woon Cha, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 198 days.

(21) Appl. No.: 13/734,607

(22) Filed: Jan. 4, 2013

(65) Prior Publication Data

US 2014/0028956 A1 Jan. 30, 2014

(30) Foreign Application Priority Data

Jul. 26, 2012 (KR) ........................ 10-2012-0081611

(51) Int. Cl.
*G02F 1/1335* (2006.01)
*G02B 5/30* (2006.01)

(52) U.S. Cl.
CPC ........ *G02F 1/133528* (2013.01); *G02B 5/3058* (2013.01); *G02F 2001/133548* (2013.01); *G02F 2202/22* (2013.01)

(58) Field of Classification Search
CPC .................. G02F 1/133528; G02B 5/3058
USPC .................. 349/46, 96; 359/485.05
See application file for complete search history.

(56) References Cited

U.S. PATENT DOCUMENTS

| | | | | |
|---|---|---|---|---|
| 7,413,766 | B2* | 8/2008 | Satake et al. .................. | 427/162 |
| 8,049,841 | B2* | 11/2011 | Sugita et al. .................... | 349/96 |
| 2008/0304153 | A1* | 12/2008 | Amako et al. ................. | 359/486 |
| 2010/0040805 | A1* | 2/2010 | Suh et al. ....................... | 428/1.4 |
| 2010/0079706 | A1* | 4/2010 | Kim et al. ....................... | 349/96 |
| 2010/0103518 | A1* | 4/2010 | Uejima et al. ................. | 359/486 |
| 2010/0182692 | A1* | 7/2010 | Kenmochi .................... | 359/486 |
| 2011/0310333 | A1* | 12/2011 | Kim et al. ....................... | 349/96 |

FOREIGN PATENT DOCUMENTS

| | | |
|---|---|---|
| JP | 11119210 A | 4/1999 |
| KR | 100290107 B1 | 2/2001 |
| KR | 1020040062158 A | 7/2004 |
| KR | 1020110138002 A | 12/2011 |

\* cited by examiner

*Primary Examiner* — James Dudek
(74) *Attorney, Agent, or Firm* — Cantor Colburn LLP

(57) ABSTRACT

A display panel includes an array substrate, an opposite substrate facing the array substrate, and a liquid crystal layer between the substrates. The array substrate includes a first polarizer, a first insulating layer covering the first metal layer, a gate electrode on the first insulating layer, a gate insulation layer on the gate electrode, a channel layer on the gate insulation layer, source and drain electrodes on the channel layer, a protecting layer covering the source and drain electrodes and including a contact hole exposing the drain electrode, and a first electrode on the protecting layer and electrically connected to the drain electrode through the contact hole. The first polarizer includes a first substrate, a first antistatic layer on the first substrate and including a conductive material, and a first metal layer on the first antistatic layer and including a plurality of protrusions which form a wire grid pattern.

15 Claims, 13 Drawing Sheets

POLARIZER, METHOD OF MANUFACTURING THE POLARIZER, DISPLAY PANEL HAVING THE POLARIZER AND DISPLAY APPARATUS HAVING THE DISPLAY PANEL

This application claims priority to Korean Patent Application No. 10-2012-0081611, filed on Jul. 26, 2012, and all the benefits accruing therefrom under 35 U.S.C. §119, the contents of which are incorporated by reference herein in their entireties.

BACKGROUND

1. Field

Exemplary embodiments of the invention relate to a polarizer, a method of manufacturing the polarizer, a display panel having the polarizer, and a display apparatus having the display panel.

More particularly, exemplary embodiments of the invention relate to a wire grid polarizer, a method of manufacturing the wire grid polarizer, a display panel having the wire grid polarizer, and a display apparatus having the display panel.

2. Description of the Related Art

A liquid crystal display apparatus having a light weight and small size has been manufactured. A cathode ray tube ("CRT") display apparatus has been used due to a performance and a competitive price. However the CRT display apparatus has a weakness with a size or portability thereof. Therefore, the liquid crystal display apparatus has been highly regarded due to a small size, light weight and low-power-consumption thereof.

The liquid crystal display apparatus applies a voltage to a specific molecular arrangement of an optical material therein, such as liquid crystal, and is configured to change the molecular arrangement of the liquid crystal. The liquid crystal display apparatus displays an image using changes of optical property (for example, birefringence, rotatory polarization, dichroism and light scattering) of a liquid crystal cell according to the changes of the molecular arrangement of the liquid crystal.

The liquid crystal display apparatus includes a polarizing plate to control an array of the molecular arrangement of the liquid crystal, a display panel, an optical sheet and a backlight assembly. An in-cell polarizer has been developed including a polarizer disposed in the display panel. However, static electricity from outside or from the optical sheet which is disposed adjacent to the display panel may flow into the display panel due to thin thickness of the liquid crystal display apparatus. The static electricity may undesirably cause flecks on the display panel when the display panel displays an image.

SUMMARY

One or more exemplary embodiment of the invention provides a polarizer capable of blocking static electricity.

Exemplary embodiments of the invention also provide a method of manufacturing the polarizer.

Exemplary embodiments of the invention also provide a display panel having the polarizer.

Exemplary embodiments of the invention also provide a display apparatus having the display panel.

According to an exemplary embodiment of the invention, a polarizer includes a substrate, an antistatic layer disposed on the substrate and including a conductive material, and a metal layer disposed on the antistatic layer and including a plurality of protrusions, the protrusions forming a wire grid pattern.

In an exemplary embodiment, the antistatic layer may include at least one selected from poly(3,4-ethylenedioxythiophene) ("PEDOT"), indium tin oxide ("ITO"), indium zinc oxide ("IZO"), and a carbon nanotube ("CNT").

In an exemplary embodiment, a thickness of the antistatic layer may be about 10 angstroms (Å) to about 100 Å.

In an exemplary embodiment, the metal layer may include a polarizing area through which light passes, and a reflecting area which reflects the light.

In an example embodiment, the polarizer may further include an insulating layer disposed between the antistatic layer and the metal layer.

In an example embodiment, thickness of the insulating layer may be about 1 micrometer ($\mu m$) to about 3 $\mu m$.

In an exemplary embodiment, a method of manufacturing a polarizer includes providing an antistatic layer including a conductive material on a substrate; providing a metal layer on the antistatic layer; providing a mask layer on the metal layer; providing a photoresist on a portion of the mask layer; providing a self-assembled pattern on an exposed portion of the mask layer; providing a wire grid pattern by pattering the mask layer and the metal layer using the self-assembled pattern as a mask; and removing the photoresist and the mask layer.

In an exemplary embodiment, the method may further include providing an insulating layer on the antistatic layer before the providing the mask layer.

In an exemplary embodiment, providing the antistatic layer may include printing or inkjet printing PEDOT on the substrate.

In an exemplary embodiment, providing the self-assembled pattern may include applying a block copolymer including a first block and a second block on the exposed portion of the mask layer; providing a lamella structure from the first and second blocks by heat treating the block copolymer; and removing one of the first and second blocks.

According to another exemplary embodiment of the invention, a display panel includes an array substrate, an opposite substrate facing the array substrate and a liquid crystal layer disposed between the array substrate and the opposite substrate. The array substrate includes a first polarizer, a first insulating layer covering the first metal layer, a gate electrode disposed on the first insulating layer, a gate insulating layer disposed on the gate electrode to insulate the gate electrode, a channel layer disposed on the gate insulating layer, source and drain electrodes disposed on the channel layer, a protecting layer covering the source and drain electrodes and including a contact hole exposing the drain electrode, and a first electrode disposed on the protecting layer and electrically connected to the drain electrode through the contact hole. The first polarizer includes a first substrate, a first antistatic layer disposed on the first substrate and including a first conductive material, and a first metal layer disposed on the first antistatic layer and including a plurality of protrusions. The protrusions form a first wire grid pattern.

In an exemplary embodiment, the opposite substrate may include a second substrate, and a polarizing plate disposed on the second substrate.

In an exemplary embodiment, the first metal layer may include a polarizing area through which light passes, and a reflecting area which reflects the light. The first wire grid pattern may be in the polarizing area. The reflecting area may overlap with a thin film transistor including the gate, source and drain electrodes.

In an exemplary embodiment, the array substrate further may include a second insulating layer disposed between the first antistatic layer and the first metal layer.

In an exemplary embodiment, the opposite substrate may include a second polarizer, a third insulating layer and a second electrode. The second polarizer may include a second substrate, a second antistatic layer disposed under the second substrate and including a second conductive material, and a second metal layer disposed under the second antistatic layer and including a plurality of protrusions. The protrusions form a second wire grid pattern. The third insulating layer may be between the second antistatic layer and the second metal layer. The second electrode may be disposed under the third insulating layer.

In an exemplary embodiment, the opposite substrate may further include a black matrix disposed under the second substrate and blocking light. The black matrix and the second metal layer may be in a same layer of the opposite substrate.

According to still another exemplary embodiment of the invention, a display apparatus includes a display panel, a backlight assembly, an optical element and a receiving container. The display panel includes an array substrate, an opposite substrate facing the array substrate and a liquid crystal layer disposed between the array substrate and the opposite substrate. The array substrate includes a first polarizer including a first substrate, an first antistatic layer disposed on the first substrate and including a conductive material, and a first metal layer disposed on the first antistatic layer and including a plurality of protrusions forming a wire grid pattern; a first insulating layer covering the first metal layer; a gate electrode disposed on the first insulating layer; a gate insulating layer disposed on the gate electrode to insulate the gate electrode; a channel layer disposed on the gate insulating layer; source and drain electrodes disposed on the channel layer; a protecting layer covering the source and drain electrodes, and including a contact hole exposing the drain electrode; and a first electrode disposed on the protecting layer and electrically connected to the drain electrode through the contact hole. The backlight assembly is disposed under the display panel, is spaced apart from the display panel and supplies light to the display panel. The optical element is disposed between the display panel and the backlight assembly. The receiving container receives the display panel, backlight assembly and the optical element.

In an exemplary embodiment, the optical element may be spaced apart from the display panel.

In an exemplary embodiment, the array substrate may further include a second insulating layer disposed between the first antistatic layer and the first metal layer.

In an exemplary embodiment, the first antistatic layer may include at least one selected from PEDOT, ITO, IZO, and a CNT.

According to one or more of the exemplary embodiments of the invention, a polarizer includes an antistatic layer, so that inflow of static electricity into a display panel may be reduced or effectively prevented.

In addition, since the display panel includes the polarizer having the antistatic layer, inflow of static electricity into a liquid crystal layer caused from an optical element disposed under the display panel may be reduced or effectively prevented.

In addition, since an insulating layer having sufficient thickness is disposed on the antistatic layer, a coupling effect between a circuit pattern of the display panel and the antistatic layer may be reduced or effectively prevented.

Thus, since the display apparatus may include the display panel. a display quality is improved by reducing or effectively preventing a spot caused by static electricity.

BRIEF DESCRIPTION OF THE DRAWINGS

The above and other features of the invention will become more apparent by describing in detail exemplary embodiments thereof with reference to the accompanying drawings, in which.

DETAILED DESCRIPTION

Figure 1:
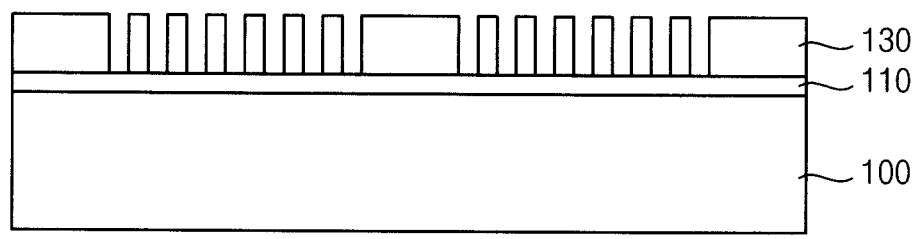
FIG. 1 is a cross-sectional view illustrating an exemplary embodiment of a polarizer according to the invention.

It will be understood that when an element or layer is referred to as being "on" or "connected to" another element or layer, the element or layer can be directly on, connected or coupled to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

FIG. 1 is a cross-sectional view illustrating an exemplary embodiment of a polarizer according to the invention.

Referring to FIG. 1, the polarizer includes a substrate 100, an antistatic layer 110 and a metal layer 130.

The substrate 100 may include a material which has relatively high transmittance, thermal resistance and chemical resistance. In one exemplary embodiment, for example, the substrate 100 may include at least one selected from glass, polyethylenenaphthalate, polyethylene terephthalate, and poly(methyl methacrylate).

The antistatic layer 110 is disposed on the substrate 100. The antistatic layer 110 may include conductive material which has a relatively high transmittance. The antistatic layer 110 may include inorganic conductive material, conductive polymer, transparent conductive material and/or carbon nanotube ("CNT"). In one exemplary embodiment, for example, the antistatic layer 110 may include poly(3,4-ethylenedioxythiophene) ("PEDOT"), but is not limited thereto or thereby. In addition or alternatively, the antistatic layer 110 may include indium tin oxide ("ITO") and/or indium zinc oxide ("IZO").

As a thickness of the antistatic layer 110 decreases, an overall thickness of the display panel may be reduced, so that an overall thickness of a display apparatus including the display panel may be reduced. In one exemplary embodiment, for example, a thickness of the antistatic layer 110 may be about 10 angstroms (Å) to about 100 Å.

The metal layer 130 is disposed on the antistatic layer 110. The metal layer 130 has a plurality of protrusions each having a first width taken parallel to a plane of the substrate 100. Adjacent protrusions are spaced apart by a second width also taken parallel to the plane of the substrate 100. The protrusions of the metal layer 130 collectively form a wire grid pattern of a wire grid polarizer. The metal layer 130 may include a least one selected from aluminum (Al), gold (Au), silver (Ag), copper (Cu), chrome (Cr), steel (Fe), and nickel (Ni).

The metal layer 130 has a wire grid pattern where light passes, and a reflecting portion where the light is blocked. Detailed description about this will be mentioned with respect to FIG. 7.

The second width may be smaller than a wavelength of an incident light to polarize the incident light. In one exemplary embodiment, for example, when the incident light is a visible light, the wavelength of the incident light is about 400 nanometers (nm) to about 700 nm, so that the second width may be smaller than about 400 nm. The second width may be smaller than about 100 nm for better performance, but is not limited thereto or thereby. The first width of a protrusion may be smaller than about 100 nm, but is not limited thereto or thereby. In addition, a thickness of the metal layer 130 taken perpendicular to the plane of the substrate 100 may be about 100 nm to about 250 nm to improve a transmittance of polarized light.

Figure 2:
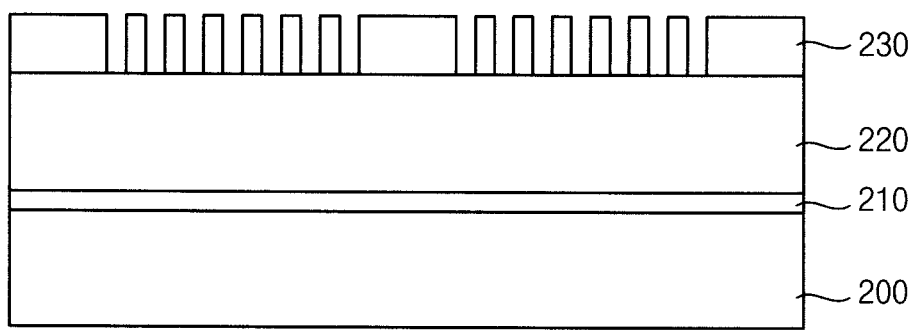
FIG. 2 is a cross-sectional view illustrating another exemplary embodiment of a polarizer according to the invention.

FIG. 2 is a cross-sectional view illustrating another exemplary embodiment of a polarizer according to the invention.

Referring to FIG. 2, the polarizer is substantially same as the polarizer of FIG. 1, except for an insulating layer 220. Thus, any further detailed descriptions concerning the same elements will be omitted.

The polarizer includes a substrate 200, an antistatic layer 210, the insulating layer 220 and a metal layer 230.

The substrate 200 may include a material which has relatively high transmittance, thermal resistance and chemical resistance. In one exemplary embodiment, for example the substrate 200 may include at least one selected from glass, polyethylenenaphthalate, polyethylene terephthalate, and poly(methyl methacrylate).

The antistatic layer 210 is disposed on the substrate 200. The antistatic layer 210 may include conductive material which has relatively high transmittance. The antistatic layer 210 may include inorganic conductive material, conductive polymer, transparent conductive material and/or CNT. In one exemplary embodiment, for example, the antistatic layer 210 may include PEDOT. In addition or alternatively, the antistatic layer 210 may include ITO and/or IZO.

As a thickness of the antistatic layer 210 decreases, an overall thickness of the display panel may be reduced, so that an overall thickness of a display apparatus including the display panel may be reduced. In one exemplary embodiment, for example, thickness of the antistatic layer 210 may be about 10 Å to about 100 Å.

The insulating layer 220 is disposed on the antistatic layer 210. The insulating layer 220 insulates the metal layer 230 from the antistatic layer 210, and a circuit pattern including a thin film transistor (refer to FIG. 7) from the antistatic layer 210. The insulating layer 220 may include any of a number of organic materials. The insulating layer 220 may have a sufficient thickness to insulate the metal layer 230 and the circuit pattern from the antistatic layer 210. In one exemplary embodiment, for example, a thickness of the insulating layer 220 may be about 1 micrometers (μm) to about 3 μm.

The metal layer 230 is disposed on the insulating layer 220. The metal layer 230 has a plurality of protrusion each having a first width. Adjacent protrusions are spaced apart by a second width. The protrusions of the metal layer 230 collectively form a wire grid pattern. The metal layer 230 may include at least one selected from aluminum (Al), gold (Au), silver (Ag), copper (Cu), chrome (Cr), steel (Fe), and nickel (Ni).

The second width may be smaller than a wavelength of an incident light to polarize the incident light. In one exemplary embodiment, for example, when the incident light is a visible light, the wavelength of the incident light is about 400 nm to about 700 nm, so that the second width may be smaller than about 400 nm. The second width may be smaller than about 100 nm for better performance. The first width of a protrusion may be smaller than about 100 nm. In addition, a thickness of the metal layer 230 may be about 100 nm to about 250 nm to improve a transmittance of polarized light.

FIGS. 3A to 3I are cross-sectional views illustrating an exemplary embodiment of a method of manufacturing the polarizer of FIG. 1

Figure 3A:
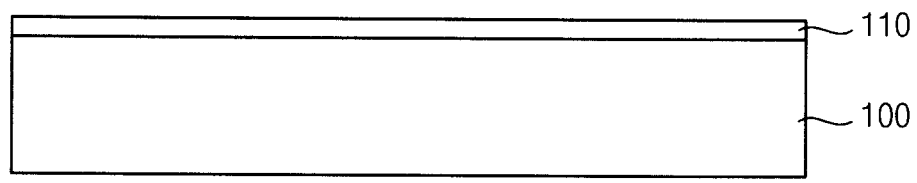
FIGS. 3A to 3I are cross-sectional views illustrating an exemplary embodiment of a method of manufacturing the polarizer of FIG. 1.

Referring to FIG. 3A, an antistatic layer 110 is formed, e.g., provided, on a substrate 100. The substrate 100 may include a material which has relatively high transmittance, thermal resistance and chemical resistance. In one exemplary embodiment, for example the substrate 100 may include at least one selected from glass, polyethylenenaphthalate, polyethylene terephthalate, and poly(methyl methacrylate).

The antistatic layer 110 may include conductive material which has relatively high transmittance. The antistatic layer 110 may include inorganic conductive material, conductive polymer, transparent conductive material and/or CNT. In one exemplary embodiment, for example, the antistatic layer 110 may include PEDOT. In addition or alternatively, the antistatic layer 110 may include ITO and/or IZO.

When the antistatic layer 110 includes the conductive polymer, the antistatic layer 110 may be formed by a spin coating process, but is not limited thereto or thereby. When the antistatic layer 110 includes the PEDOT, the antistatic layer 110 may be formed by a printing process or an inkjet printing process, but is not limited thereto or thereby. When the antistatic layer 110 includes the ITO and/or IZO, the antistatic layer 110 may be formed by a sputtering process, but is not limited thereto or thereby.

Figure 3B:
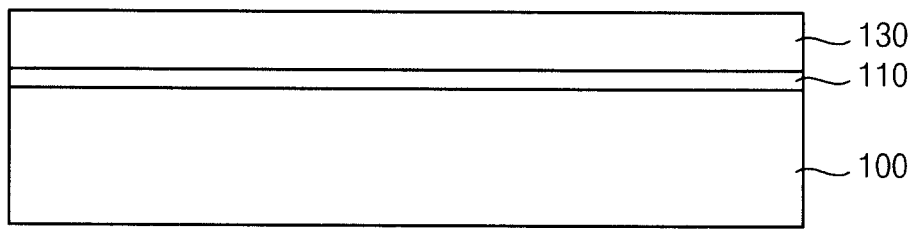

Referring to FIG. 3B, a metal layer 130 is formed on the antistatic layer 110. The metal layer 130 may include at least one selected from aluminum (Al), gold (Au), silver (Ag), copper (Cu), chrome (Cr), steel (Fe), and nickel (Ni). The metal layer 130 may be formed by a deposition process, but is not limited thereto or thereby. In one exemplary embodiment, for example, the metal layer 130 may be formed by a chemical vapor deposition. A thickness of the metal layer 130 may be about 100 nm to about 200 nm. In one exemplary embodiment, the thickness of the metal layer 130 may be about 150 nm.

The thickness of the metal layer 130 may be determined in accordance with a size of a wire grid pattern which will be mentioned later. Considering a gap of the wire grid pattern for polarizing and strength of a wire grid structure including the wire grid pattern, the thickness of the metal layer 130 may be three times larger than the second width between adjacent protrusions of the metal layer 130.

Figure 3C:
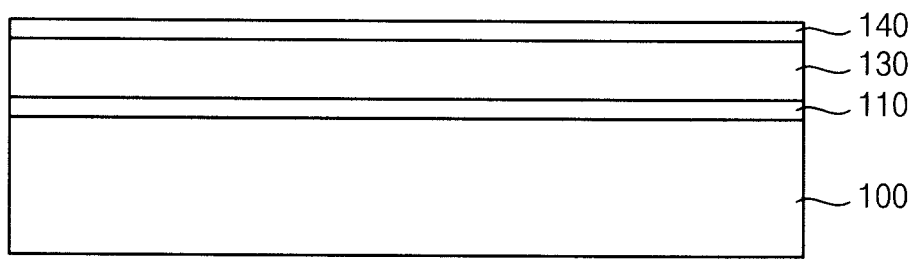

Referring to FIG. 3C, a mask layer 140 is formed on the metal layer 130. The mask layer 140 may include silicon oxide (SiOx), but is not limited thereto or thereby. In one exemplary embodiment, for example, the mask layer 140 may include a silicon dioxide. The mask layer 140 may be formed by a deposition process, but is not limited thereto or thereby. In one exemplary embodiment, for example, the mask layer 140 may be formed by a chemical vapor deposition.

Figure 3D:
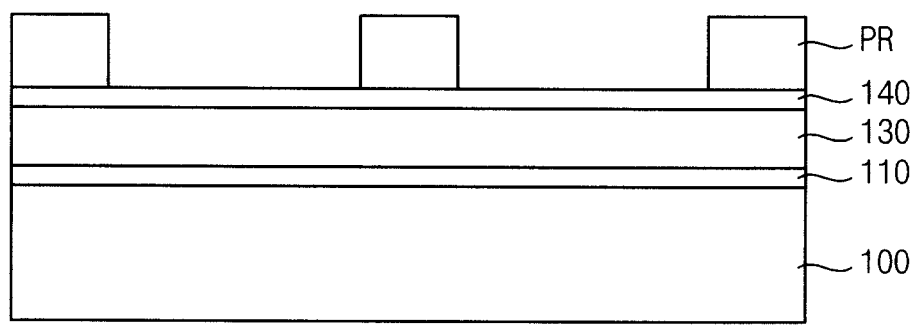

Referring to FIG. 3D, a photoresist PR is formed on the mask layer 140. The photoresist PR corresponds to a reflecting portion where the wire grid pattern is not formed. The photoresist PR may be formed by forming a photoresist layer on the mask layer 140 and patterning the photoresist layer such as by a photolithography.

Figure 3E:
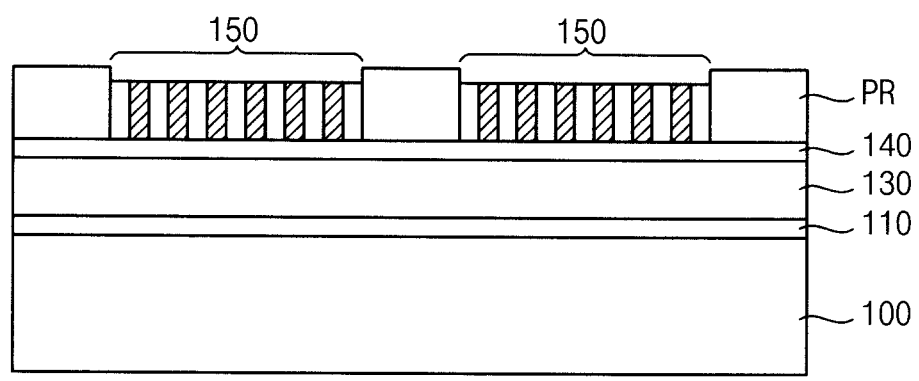

Referring FIG. 3E, a block copolymer 150 including a first block and a second block is formed on the mask layer 140 having the photoresist PR thereon. The block copolymer 150 is heated to form a lamella structure by arrangement of the first and second blocks.

Self-assembling of the block copolymer 150 includes the growing of a first lamella domain of one of the first and second blocks, and the growing of a second lamella domain of one of the first and second blocks in a different position than the first lamella domain.

The block copolymer 150 may include at least one selected from poly(styrene-b-methylmethacrylate) ("PS-b-PMMA"), poly(styrene-b-butadiene) ("PS-b-PB"), poly(styrene-b-isoprene) ("PS-b-PI"), poly(styrene-b-ethylene) ("PS-b-PE"), poly(styrene-b-ethyleneoxide) ("PS-b-PEO"), poly(styrene-b-ferrocenyldimethylsilane) ("PS-b-PFS"), poly(styrene-b-(2-vinylpyridine)) ("PS-b-P2VP"), and poly(styrene-b-dimethylsiloxane) ("PS-b-PDMS"). In addition, a molecular weight, e.g., a weight average molecular weight, of the block copolymer 150 may be about 10,000 kilograms per mole (kg/mol) to about 300,000 kg/mol.

As an example, PS-b-PMMA, which is a symmetrical diblock copolymer (hereinafter, block copolymer) has a molecular weight of 52,000 kg/mol with lamellar spacing of 48 nm. Alternatively, the block copolymer 150 is not limited to above mentioned materials, may be various materials to form the lamella structure.

A heat treatment temperature of the block copolymer 150 for self-assembly may be above a glass transition temperature of the block copolymer 150 such that the block copolymer 150 has liquidity, and under a thermal decomposition temperature of the block copolymer 150. In one exemplary embodiment, for example, PS-b-PMMA may be self-assembled over about 100 degrees Celsius (° C.), but self-assembling may take long time at a relatively low temperature such as 100° C. When a higher heat treatment temperature of about 250° C. is used in a vacuum atmosphere without oxygen, a flow of molecules may be smoother and quicker. Thus, self-assembling may be evenly processed and completed in relatively short time when a higher heat treatment temperature is used.

Before the heat treatment, molecules of the first block and the second block of the block copolymer 150 are disorderly distributed. After the heat treatment begins, the molecules move and form a more orderly distributed specific pattern. Thus, the first blocks form a specific pattern, and the second blocks form a specific pattern. The first and second blocks of the block copolymer 150 collectively form the lamella structure.

Figure 3F:
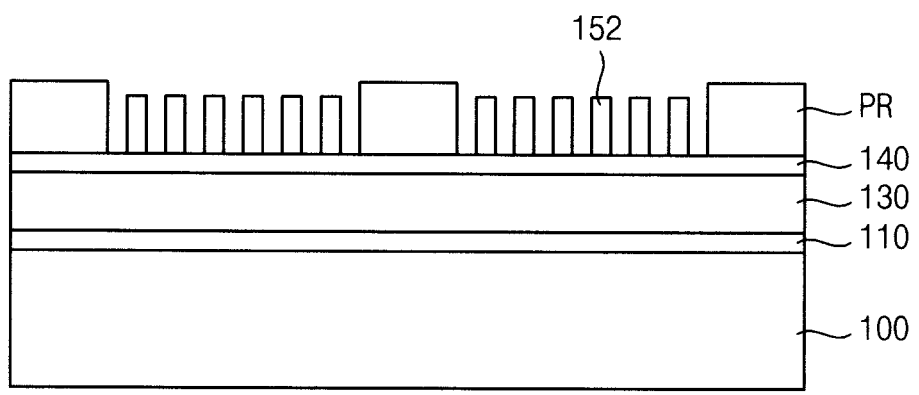

Referring to FIG. 3F, a pattern 152 is formed by removing one of the first and second blocks of the block copolymer 150. The one of the first and second blocks may be removed by a dry etching or a wet etching, but is not limited thereto or thereby. When the block copolymer 150 includes PS-b-PMMA, after ultraviolet-ozone treatment ("UVO"), the block copolymer 150 may be dry-etched using an acetic acid solution. In addition, a PMMA block may be selectively removed by using dry etching such as O2 plasma etching.

Figure 3G:
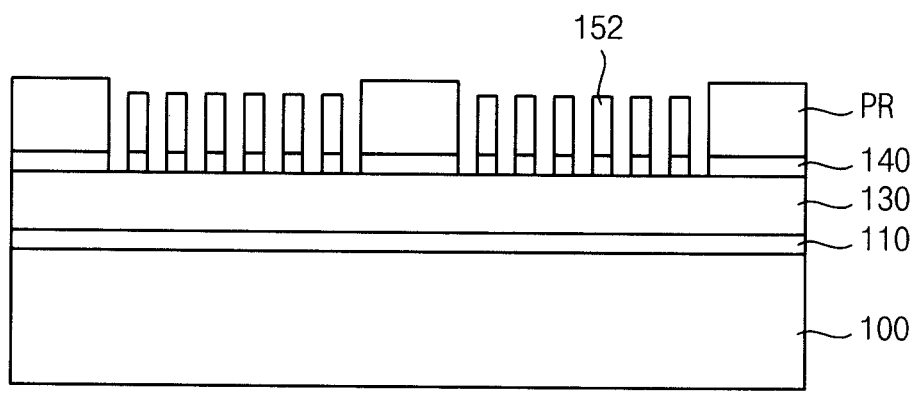

Referring to FIG. 3G, a portion of the mask layer 140 is exposed by the pattern 152. The exposed portion of the mask layer 140 is removed. The mask layer 140 may be removed by dry etching, but is not limited thereto or thereby. The exposed portion of the mask layer 140 is removed, so that a portion of the metal layer 130 is exposed.

Figure 3H:
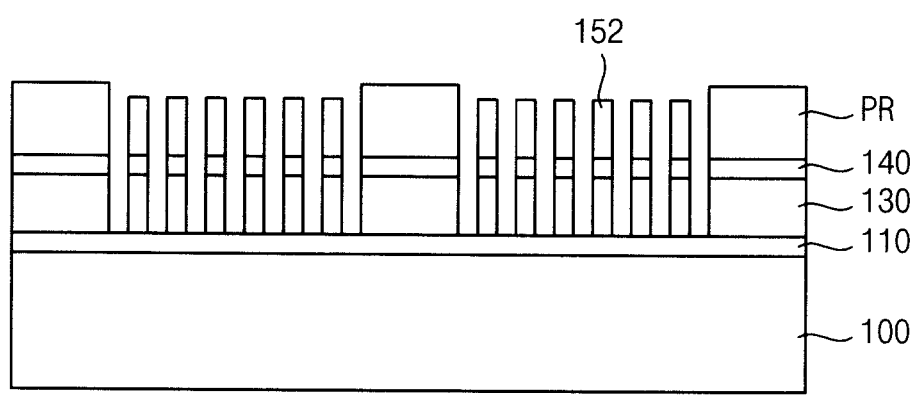

Referring to FIG. 3H, the portion of the metal layer 130 which is exposed is removed. The exposed portion of the metal layer 130 is removed, so that a wire grid pattern is formed. A size of the wire grid pattern may be adjusted by controlling a thickness of the metal layer 130, and of the first and second blocks of the block copolymer 150. The exposed portion of the metal layer 130 may be removed by dry etching.

Figure 3I:
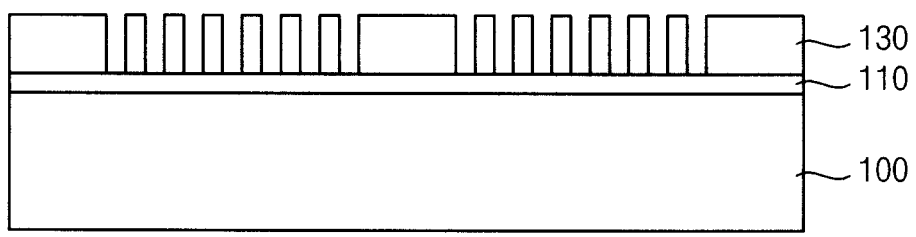

Referring to FIG. 3I, the photoresist PR, the pattern 152 and the mask layer 140 are removed. The photoresist PR, the pattern 152 and the mask layer 140 may be removed by dry etching or wet etching, but is not limited thereto or thereby. In addition, the photoresist PR, the pattern 152 and the mask layer 140 may be removed sequentially or at substantially a same time.

FIGS. 4A to 4G are cross-sectional views illustrating an exemplary embodiment of a method of manufacturing the polarizer of FIG. 2.

Figure 4A:
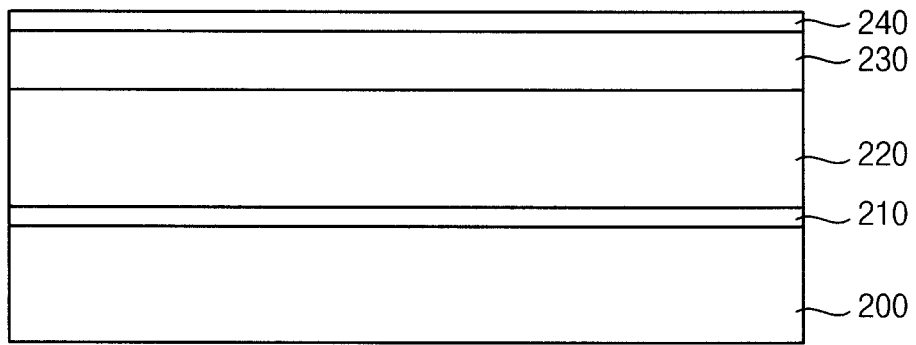
FIGS. 4A to 4G are cross-sectional views illustrating an exemplary embodiment of a method of manufacturing the polarizer of FIG. 2.

Referring to FIG. 4A, an antistatic layer 210 is formed on a substrate 200. An insulating layer 220 is formed on the antistatic layer 210. A metal layer 230 is formed on the insulating layer 220. A mask layer 240 is formed on the metal layer 230.

The substrate 200 may include a material which has relatively high transmittance, thermal resistance and chemical resistance. In one exemplary embodiment, for example, the substrate 200 may include at least one selected from glass, polyethylenenaphthalate, polyethylene terephthalate, and poly(methyl methacrylate).

The antistatic layer 210 is disposed on the substrate 200. The antistatic layer 210 may include conductive material which has a relatively high transmittance. The antistatic layer 210 may include inorganic conductive material, conductive polymer, transparent conductive material and/or CNT. In one exemplary embodiment, for example, the antistatic layer 210 may include PEDOT. In addition or alternatively, the antistatic layer 210 may include indium ITO and/or IZO.

When the antistatic layer 210 includes the conductive polymer, the antistatic layer 210 may be formed by a spin coating process. When the antistatic layer 210 includes the PEDOT, the antistatic layer 210 may be formed by a printing process or an inkjet printing process. When the antistatic layer 210 includes the ITO and/or IZO, the antistatic layer 110 may be formed by a sputtering process.

The insulating layer 220 insulates the metal layer 230 from the antistatic layer and a circuit pattern including a thin film transistor (refer to FIG. 7) from the antistatic layer 210. The insulating layer 220 may include any of a number of organic materials. The insulating layer 220 may have a sufficient thickness to insulate the metal layer 230 and the circuit pattern from the antistatic layer 210. In one exemplary embodiment, for example, the thickness of the insulating layer 220 may be about 1 μm to about 3 μm. The insulating layer 220 may be formed by a deposition, but it not limited thereto or thereby. In one exemplary embodiment, for example, the insulating layer 220 may be formed by a chemical vapor deposition.

The metal layer 230 may include at least one selected from aluminum (Al), gold (Au), silver (Ag), copper (Cu), chrome (Cr), steel (Fe), and nickel (Ni). The metal layer 230 may be formed by a deposition process. In one exemplary embodiment, for example, the metal layer 130 may be formed by a chemical vapor deposition. A thickness of the metal layer 230 may be about 100 nm to about 200 nm. In one exemplary embodiment, the thickness of the metal layer 230 may be about 150 nm.

The thickness of the metal layer 230 may be determined in accordance with a size of a wire grid pattern which will be mentioned later. Considering a gap of the wire grid pattern for polarizing and strength of a wire grid structure including the wire grid pattern, the thickness of the metal layer 230 may be three times larger than the second width between adjacent protrusions of the metal layer 230.

The mask layer 240 may include silicon oxide (SiOx). In one exemplary embodiment, for example, the mask layer 240 may include a silicon dioxide. The mask layer 240 may be formed by a deposition process. In one exemplary embodiment, for example, the mask layer 240 may be formed by a chemical vapor deposition.

Figure 4B:
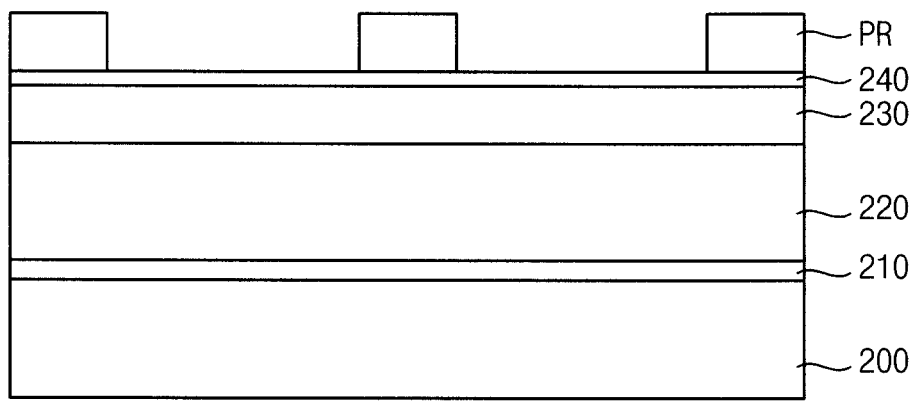

Referring to FIG. 4B, a photoresist PR is formed on the mask layer 240. The photoresist PR corresponds to a reflecting portion where the wire grid pattern is not formed. The photoresist PR may be formed by forming a photoresist layer on the mask layer 240 and patterning the photoresist layer such as by a photolithography.

Figure 4C:
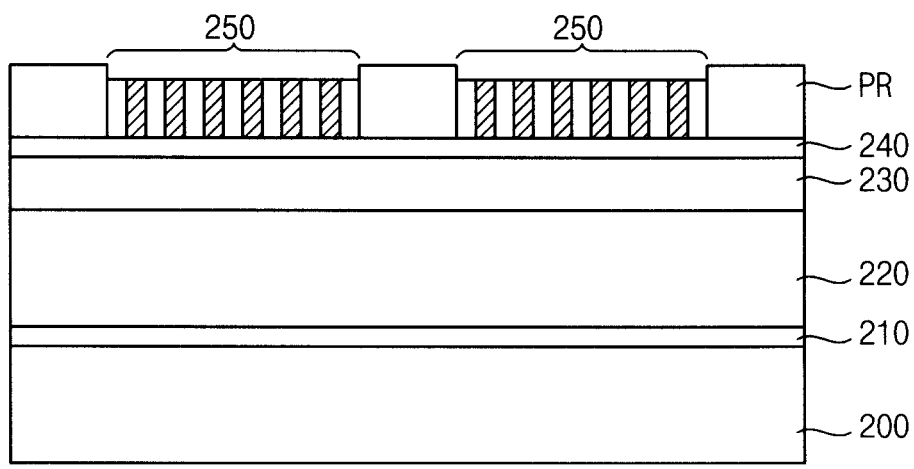

Referring to FIG. 4C, a block copolymer 250 including a first block and a second block is formed on the mask layer 240 having the photoresist PR thereon. The block copolymer 250 is heated to form a lamella structure by arrangement of the first and second blocks.

Self-assembling of the block copolymer 250 includes the growing of a first lamella domain of one of the first and second blocks, and the growing of another lamella domain of one of the first and second blocks in a different position than the first lamella domain.

The block copolymer 250 may include at least one selected from PS-b-PMMA, PS-b-PB, PS-b-PI, PS-b-PE, PS-b-PEO, PS-b-PFS, PS-b-P2VP, and PS-b-PDMS. In addition, a molecular weight, e.g., a weight average molecular weight, of the block copolymer 250 may be about 10,000 kg/mol to about 300,000 kg/mol.

As an example, PS-b-PMMA, which is a symmetrical diblock copolymer (hereinafter, block copolymer) has a molecular weight of 52,000 kg/mol with lamellar spacing of 48 nm. Alternatively, the block copolymer 250 is not limited to above mentioned materials, may be various materials to form the lamella structure.

A heat treatment temperature of the block copolymer 250 for self-assembly may be above a glass transition temperature of the block copolymer 250 such that the block copolymer 250 has liquidity, and under a thermal decomposition temperature of the block copolymer 250. In one exemplary embodiment, for example, PS-b-PMMA may be self-assembled over about 100° C., but self-assembling may take long time at a relatively low temperature such as 100° C. When heat treatment temperature of about 250° C. high is used in a vacuum atmosphere without oxygen, a flow of molecules may be smoother and quicker. Thus, self-assembling may be evenly processed and completed in relatively short time when a higher heat treatment temperature is used.

Before the heat treatment, molecules of the first block and the second block of the block copolymer 250 are disorderly distributed. After the heat treatment begins, the molecules move and form a more orderly distributed specific pattern. Thus, the first blocks form a specific pattern, and the second blocks form a specific pattern. The first and second blocks of the block copolymer 250 collectively form the lamella structure.

Figure 4D:
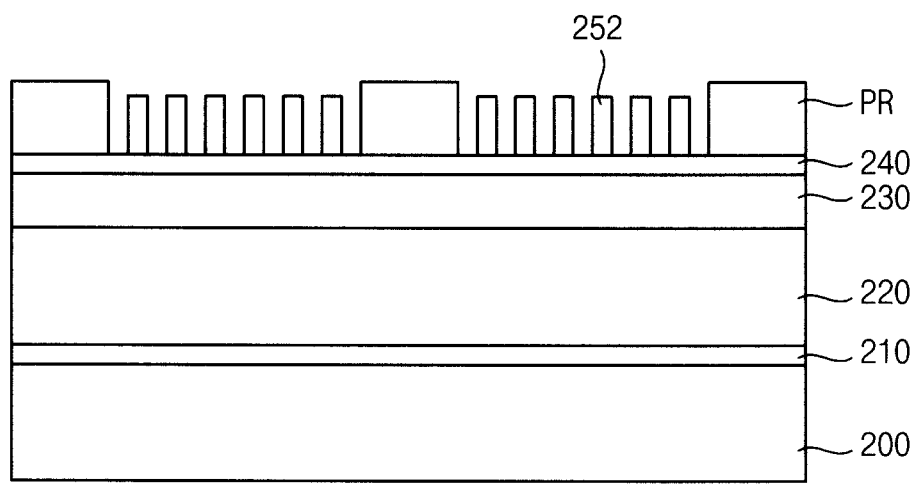

Referring to FIG. 4D, a pattern 252 is formed by removing one of the first and second blocks of the block copolymer 250. The one of the first and second blocks may be removed by a dry etching or a wet etching. When the block copolymer 250 includes PS-b-PMMA, after UVO, the block copolymer 250 may be dry-etched using an acetic acid solution. In addition, a PMMA block may be selectively removed by using dry etching such as O2 plasma etching.

Figure 4E:
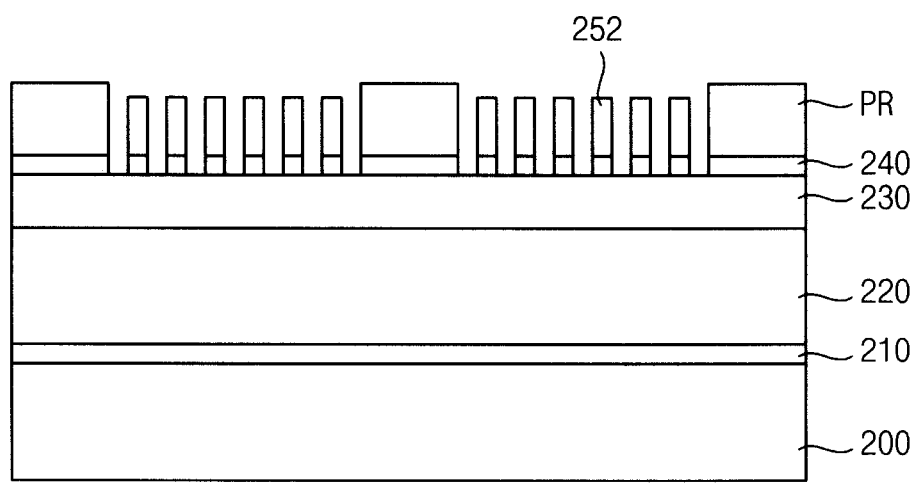

Referring to FIG. 4E, a portion of the mask layer 240 is exposed by the pattern 252. The exposed portion of the mask layer 240 is removed. The mask layer 240 may be removed by dry etching. The exposed portion of the mask layer 240 is removed, so that a portion of the metal layer 230 is exposed.

Figure 4F:
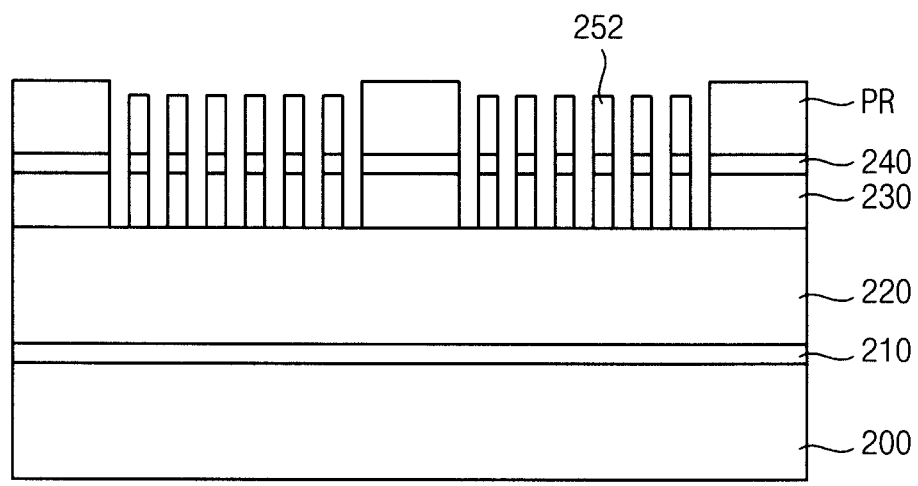

Referring to FIG. 4F, the portion of the metal layer 230 which is exposed is removed. The exposed portion of the metal layer 230 is removed, so that a wire grid pattern is formed. A size of the wire grid pattern may be adjusted by controlling a thickness of the metal layer 230, and of the first and second blocks of the block copolymer 250. The exposed portion of the metal layer 230 may be removed by dry etching.

Figure 4G:
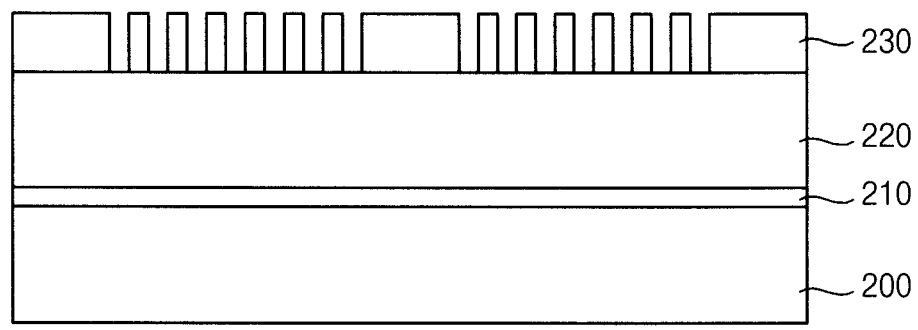

Referring to FIG. 4G, the photoresist PR, the pattern 252 and the mask layer 240 are removed. The photoresist PR, the pattern 252 and the mask layer 240 may be removed by dry etching or wet etching. In addition, the photoresist PR, the pattern 252 and the mask layer 140 may be removed sequentially or at substantially a same time.

Figure 5:
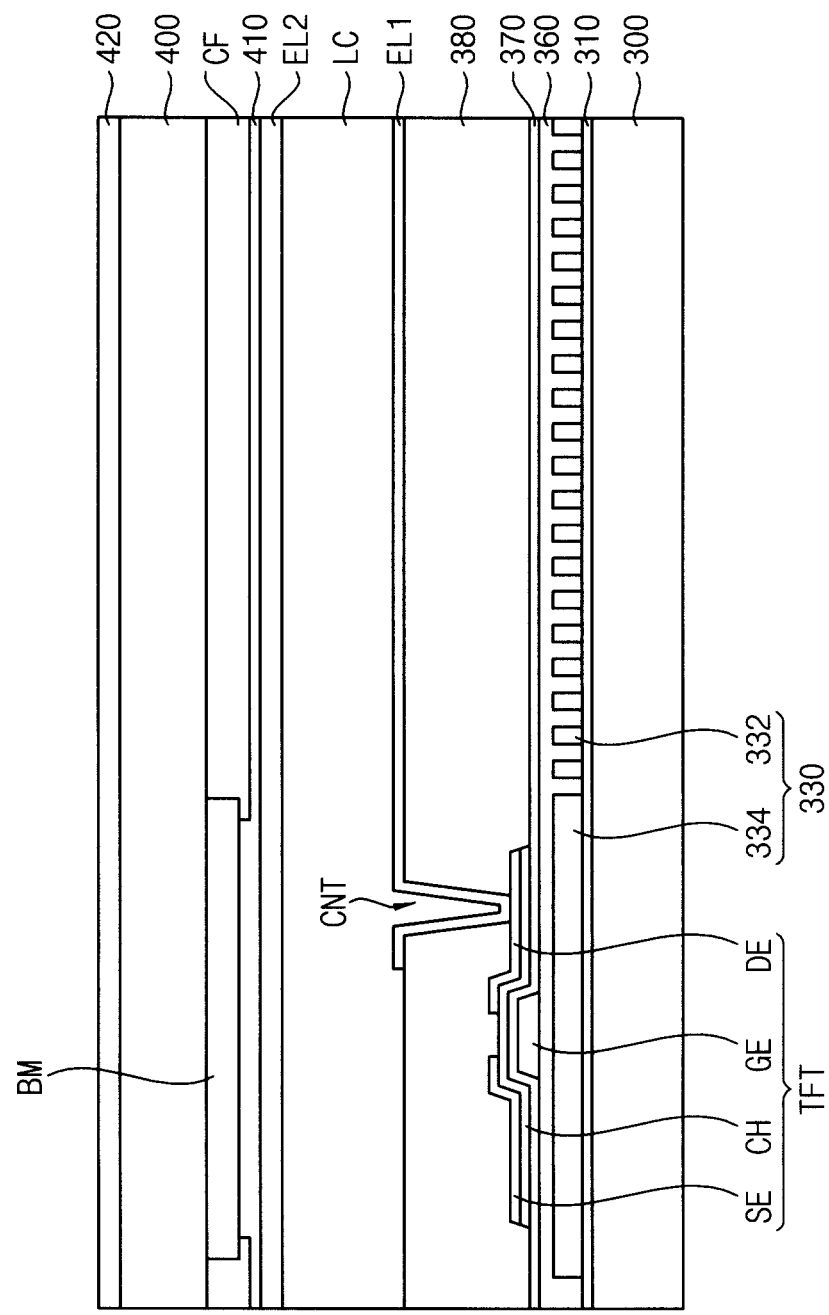
FIG. 5 is a cross-sectional view illustrating an exemplary embodiment of a display panel according to the invention.

FIG. 5 is a cross-sectional view illustrating an exemplary embodiment of a display panel according to the invention.

The display panel includes an array substrate, an opposite substrate facing the array substrate, and a liquid crystal layer LC disposed between the array substrate and the opposite substrate.

The array substrate includes a first substrate 300, a first antistatic layer 310, a first metal layer 330, a first insulating layer 360, a gate insulation layer 370, a thin film transistor TFT, a protecting layer 380 and a first electrode EL1.

The first substrate 300 may include a material which has relatively high transmittance, thermal resistance and chemical resistance. In one exemplary embodiment, for example, the first substrate 300 may include at least one selected from glass, polyethylenenaphthalate, polyethylene terephthalate, and poly(methyl methacrylate).

The first antistatic layer 310 is disposed on the first substrate 300. The first antistatic layer 310 may include conductive material which has a relatively high transmittance. The first antistatic layer 310 may include inorganic conductive material, conductive polymer, transparent conductive material and/or CNT. In one exemplary embodiment, for example, the first antistatic layer 310 may include PEDOT. In addition or alternatively, the first antistatic layer 310 may include ITO and/or IZO.

As a thickness of the first antistatic layer 310 decreases, an overall thickness of the display panel may be reduced, so that an overall thickness of a display apparatus including the display panel may be reduced. In one exemplary embodiment, for example, a thickness of the first antistatic layer 310 may be about 10 Å to about 100 Å.

The first metal layer 330 is disposed on the first antistatic layer 310. The first metal layer 330 includes a polarizing portion 332 and a reflecting portion 334.

Light passes through the polarizing portion 332. The polarizing portion 332 includes a plurality of protrusions each having a first width. Adjacent protrusions are spaced apart by a second width. The protrusions collectively form a wire grid pattern.

The reflecting portion 334 reflects the light to improve a light-efficiency of the display panel. The reflecting portion 334 corresponds to a circuit pattern including the thin film transistor.

The first metal layer 330 may include at least one selected from aluminum (Al), gold (Au), silver (Ag), copper (Cu), chrome (Cr), steel (Fe), and nickel (Ni).

The first insulating layer 360 is disposed on the first metal layer 330 and the first antistatic layer 310. The first insulating layer 360 may include silicon oxide (SiOx).

A gate electrode GE and a gate line (not shown) are disposed on the first insulating layer 360.

The gate insulation layer 370 is disposed on the first insulating layer 360 including the gate electrode GE and the gate line thereon. The gate insulation layer 370 may include inorganic material, such as silicon nitride (SiNx) and/or silicon oxide (SiOx), but is not limited thereto or thereby.

A channel layer CH overlapping with the gate electrode GE is disposed on the gate insulation layer 370.

The channel layer CH may include a semiconductor layer consisting of amorphous silicon ("a-Si:H") and an ohmic contact layer consisting of n+ amorphous silicon ("n+a-Si: H"). In addition or alternatively, the channel layer CH may include an oxide semiconductor. The oxide semiconductor may include an amorphous oxide including at least one selected from indium (In), zinc (Zn), gallium (Ga), tin (Sn), and hafnium (Hf). In one exemplary embodiment, the oxide semiconductor may consist of an amorphous oxide including at least one selected from indium (In), zinc (Zn), and gallium (Ga), or an amorphous oxide including at least one selected from indium (In), zinc (Zn) and hafnium (Hf). The oxide semiconductor may include an oxide such as indium zinc oxide (e.g., "InZnO"), indium gallium oxide (e.g., "InGaO"), indium tin oxide (e.g., "InSnO"), zinc tin oxide (e.g., "ZnSnO"), gallium tin oxide (e.g., "GaSnO"), and gallium zinc oxide (e.g., "GaZnO").

A source electrode SE and a drain electrode DE are disposed on the channel layer CH. The source electrode SE is electrically connected to a data line (not shown), and the drain electrode DE is electrically connected to the first electrode EL1 through a contact hole CNT which extends through the protecting layer 380.

The gate electrode GE, the source electrode SE, the drain electrode DE and the channel layer CH form the thin film transistor TFT.

The protecting layer 380 is disposed on the thin film transistor TFT. The protecting layer 380 may include inorganic material such as silicon oxide (SiOx) and/or silicon nitride (SiNx), but is not limited thereto or thereby. In addition, the protecting layer 380 may include organic insulating material having relatively low permittivity. In addition or alternatively, the protecting layer 380 may have a double layer structure of including an inorganic and an organic insulating layer. The protecting layer 380 includes the contact hole CNT exposing a portion of the drain electrode DE.

The first electrode EL1 is disposed on the protecting layer 380. The first electrode EL1 is electrically connected to the drain electrode DE through the contact hole CNT. The first electrode EL1 may have a slit pattern having a plurality of openings. The first electrode EL1 may include a transparent conductive material, such as ITO, IZO and the like.

The opposite substrate includes a second substrate 400, a black matrix BM, a color filter CF, an over coating layer 410, a second electrode EL2 and an upper polarizer 420.

The second substrate 400 faces the first substrate 300. The substrate 400 may include a material which has relatively high transmittance, thermal resistance and chemical resistance. In one exemplary embodiment, for example the substrate 400 may include at least one selected from glass, polyethylenenaphthalate, polyethylene terephthalate, and poly (methyl methacrylate).

The black matrix BM is disposed under the second substrate 400. The black matrix BM corresponds to an area excluding a pixel area, and blocks light. Thus, the black matrix BM overlaps with the data line, the gate line and the thin film transistor TFT.

The color filter CF is disposed under the black matrix BM and the second substrate 400. The color filter CF colors the light passing through the liquid crystal layer LC. The color filter CF may include a red color filter, a green color filter and blue color filter, but is not limited thereto or thereby. The color filter CF corresponds to the pixel area. The display panel may include a plurality of pixel areas and a plurality of color filters CF. Adjacent color filters may have different colors from each other. A color filter CF may be overlapped with an adjacent color filter CF in a boundary of the pixel area, or the color filter CF may be spaced apart from the adjacent color filter CF in the boundary of the pixel area.

The over coating layer 410 is disposed under the color filter CF and the black matrix BM. The over coating layer 410 planarizes, protects and insulates the color filter CF. The over coating layer 410 may include acrylic epoxy, but is not limited thereto or thereby.

The second electrode EL2 corresponds to the pixel area, and is disposed between the over coating layer 410 and the liquid crystal layer LC. The second electrode EL2 is electrically connected to a common line (not shown) of a display apparatus. The second electrode EL2 may have a slit pattern having a plurality of openings. The second electrode EL2 may include a transparent conductive material, such as ITO, IZO and the like.

The upper polarizer 420 is disposed on the second substrate 400. The upper polarizer 420 may be any one of a number of absorbing polarizers and further description is omitted for convenience.

The liquid crystal layer LC is disposed between the array substrate and the opposite substrate. The liquid crystal layer LC includes liquid crystal molecules having optical anisotropy. The liquid crystal molecules are driven by electric field, so that an image is displayed by passing or blocking light through the liquid crystal layer LC.

Figure 6:
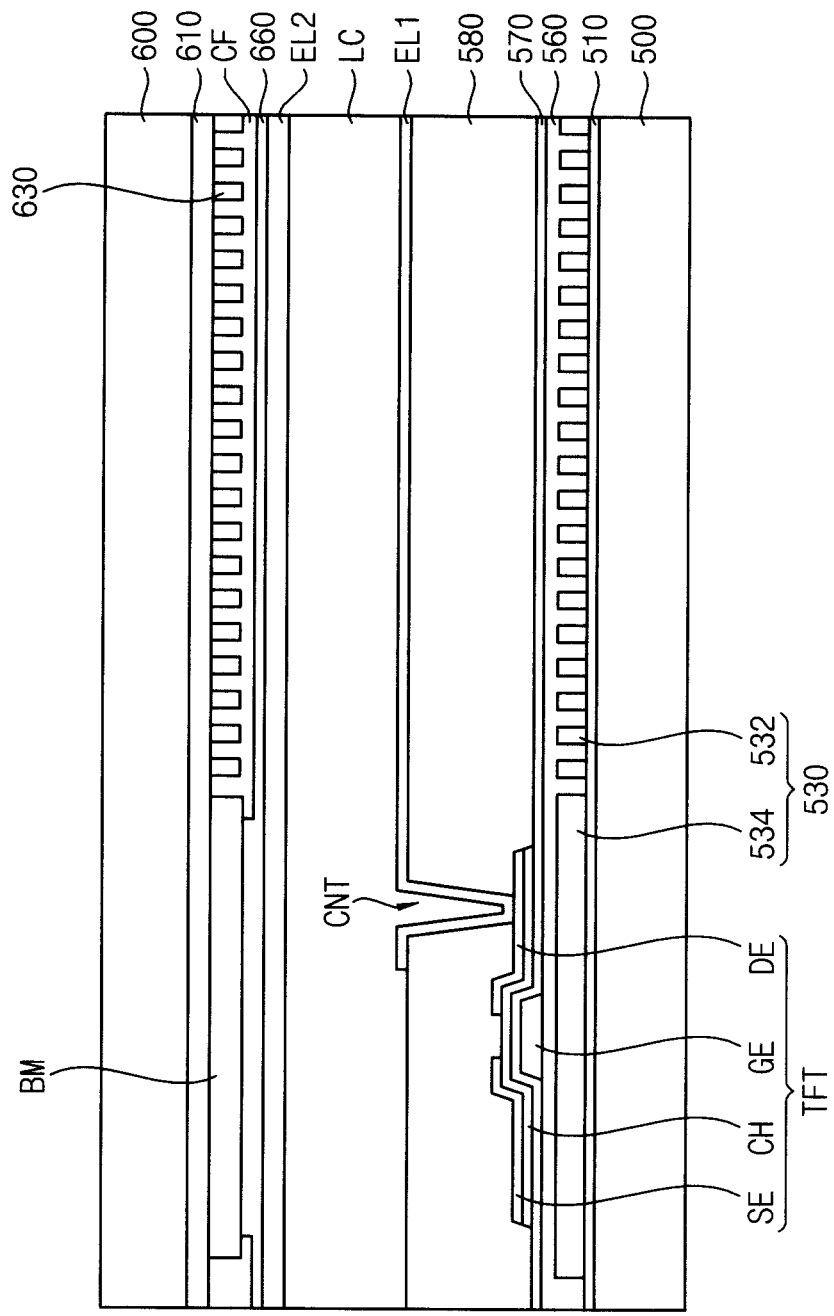
FIG. 6 is a cross-sectional view illustrating another exemplary embodiment of a display panel according to the invention.

FIG. 6 is a cross-sectional view illustrating another exemplary embodiment of a display panel according to the invention.

Referring to FIG. 6, the display panel is substantially the same as the display panel of FIG. 5, except for an opposite substrate. Thus, any further detailed descriptions concerning the same elements will be omitted.

Referring to FIG. 6, the display panel includes an array substrate, an opposite substrate facing the array substrate, and a liquid crystal layer LC disposed between the array substrate and the opposite substrate.

The array substrate includes a first substrate 500, a first antistatic layer 510, a first metal layer 530 including a polarizing portion 532 and a reflecting portion 534, a first insulating layer 560, a gate insulation layer 570, a thin film transistor TFT, a protecting layer 580 and a first electrode EL1.

The opposite substrate includes a second substrate 600, a second antistatic layer 610, a second metal layer 630, a black matrix BM, a color filter CF, an over coating layer 660 and a second electrode EL2.

The second substrate 600 faces the first substrate 500. The substrate 600 may include a material which has relatively high transmittance, thermal resistance and chemical resistance. In one exemplary embodiment, for example the substrate 600 may include at least one selected from glass, polyethylenenaphthalate, Polyethylene terephthalate, and poly (methyl methacrylate).

The second antistatic layer 610 is disposed under the substrate 600. The second antistatic layer 610 may include conductive material which has a relatively high transmittance. The second antistatic layer 610 may include inorganic conductive material, conductive polymer, transparent conductive material and/or CNT. In one exemplary embodiment, for example, the second antistatic layer 610 may include PEDOT. In addition or alternatively, the second antistatic layer 610 may include ITO and/or IZO.

As a thickness of the second antistatic layer 610 decreases, an overall thickness of the display panel may be reduced, so that an overall thickness of a display apparatus including the display panel may be reduced. In one exemplary embodiment, for example, a thickness of the second antistatic layer 610 may be about 10 Å to about 100 Å.

The second metal layer 630 is disposed under the second antistatic layer 610. The second metal layer 630 includes a plurality of protrusion each having a first width. Adjacent protrusions are spaced apart by a second width. The protrusions collectively form a wire grid pattern. The second metal layer 630 may include at least one selected from (Al), gold (Au), silver (Ag), copper (Cu), chrome (Cr), steel (Fe), and nickel (Ni).

The black matrix BM is disposed under the second antistatic layer 610. The black matrix BM corresponds to an area excluding the pixel area, and blocks light. Thus, the black matrix BM overlaps with the data line, the gate line and the thin film transistor TFT. The black matrix BM and the second metal layer 630 may include a same material and/or may be in a same layer of the opposite substrate of the display panel.

The color filter CF is disposed under the second metal layer 630. The color filter CF colors the light passing through the liquid crystal layer LC. The color filter CF may include a red color filter, a green color filter and blue color filter. The color filter CF corresponds to the pixel area. The display panel may include a plurality of pixel areas and a plurality of color filters CF. Adjacent color filters may have different colors. A color filter CF may be overlapped with adjacent color filter CF in a boundary of the pixel area, or the color filter CF may be spaced apart from the adjacent color filter CF in the boundary of the pixel area.

The over coating layer 660 is disposed under the color filter CF and the black matrix BM. The over coating layer 660 planarizes, protects and insulates the color filter CF. The over coating layer 660 may include acrylic epoxy.

The second electrode EL2 corresponds to the pixel area, and is disposed between the over coating layer 660 and the liquid crystal layer LC. The second electrode EL2 may include a transparent conductive material, such as ITO, IZO and the like.

Figure 7:
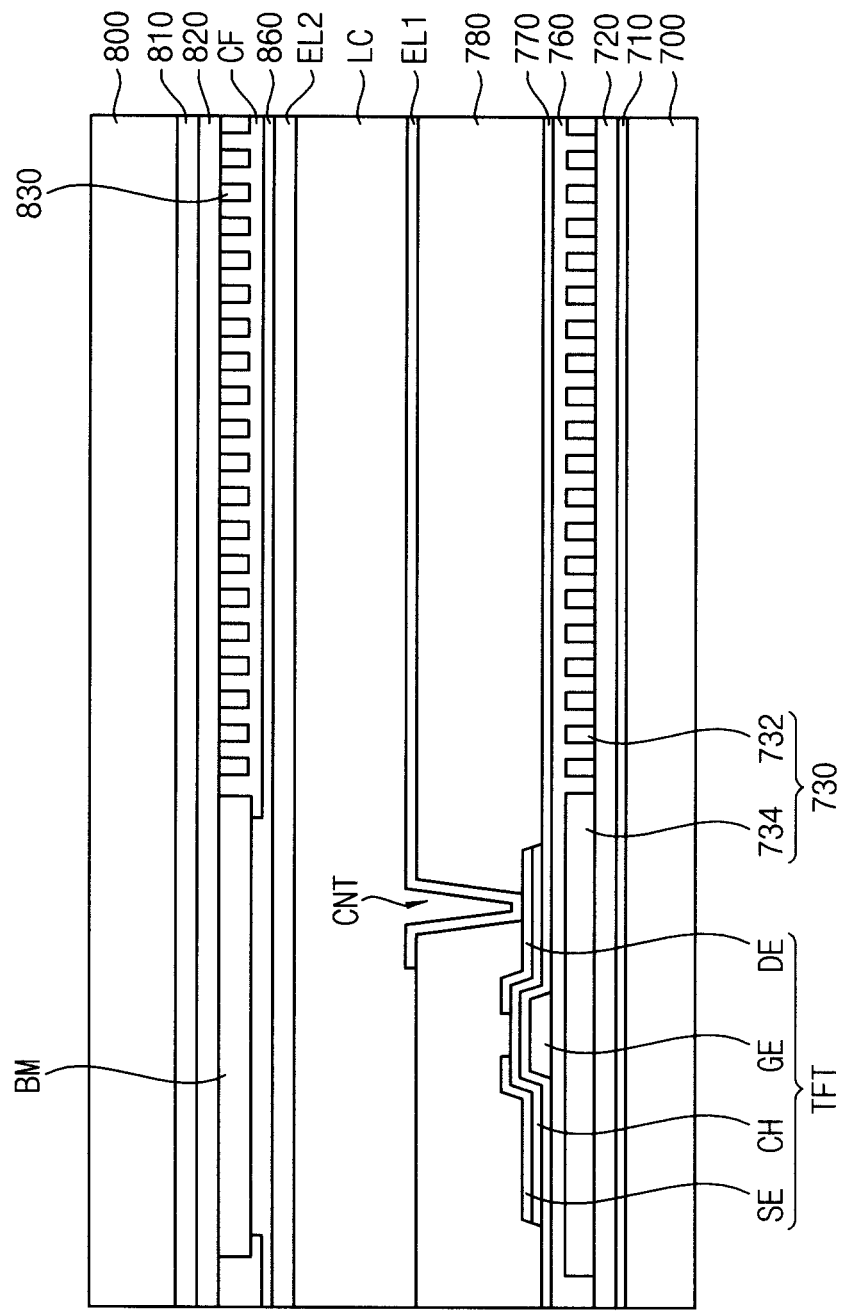
FIG. 7 is a cross-sectional view illustrating still another exemplary embodiment of a display panel according to the invention.

FIG. 7 is a cross-sectional view illustrating still another exemplary embodiment of a display panel according to the invention.

Referring to FIG. 7, the display panel includes an array substrate, an opposite substrate facing the array substrate, and a liquid crystal layer LC disposed between the array substrate and the opposite substrate.

The array substrate includes a first substrate 700, a first antistatic layer 710, a first insulating layer 720, a first metal layer 730, a second insulation layer 760, a gate insulation layer 770, a thin film transistor TFT, a protecting layer 780 and a first electrode EL1.

The first substrate 700 may include a material which has relatively high transmittance, thermal resistance and chemical resistance. In one exemplary embodiment, for example, the first substrate 700 may include at least one selected from glass, polyethylenenaphthalate, polyethylene terephthalate, and poly(methyl methacrylate).

The first antistatic layer 710 is disposed on the first substrate 700. The first antistatic layer 710 may include conductive material which has a relatively high transmittance. The first antistatic layer 710 may include inorganic conductive material, conductive polymer, transparent conductive material and/or CNT. In one exemplary embodiment, for example, the first antistatic layer 710 may include PEDOT. In addition or alternatively, the first antistatic layer 310 may ITO and/or IZO. A thickness of the first antistatic layer 710 may be about 10 Å to about 100 Å.

The first insulating layer 720 is disposed on the first antistatic layer 710. The first insulating layer 720 insulates the first metal layer 730 from the first antistatic layer 710 and a circuit pattern including a thin film transistor (refers to FIG. 7) from the first antistatic layer 710. The first insulating layer 720 may include any of a number of organic materials. The first insulating layer 720 may have a sufficient thickness to insulate the first metal layer 730 and the circuit pattern from the first antistatic layer 710. In one exemplary embodiment, for example, the thickness of the first insulating layer 720 may be about 1 μm to 3 about μm.

The first metal layer 730 is disposed on the first insulating layer 720. The first metal layer 730 includes a polarizing portion 732 and a reflecting portion 734.

Light passes through the polarizing portion 732. The polarizing portion 732 includes a plurality of protrusions each having a first width. Adjacent protrusions spaced apart by a second width. The protrusions collectively form a wire grid pattern.

The reflecting portion 734 reflects the light to improve a light-efficiency of the display panel. The reflecting portion 734 corresponds to a circuit pattern including the thin film transistor.

The first metal layer 730 may include at least one selected from aluminum (Al), gold (Au), silver (Ag), copper (Cu), chrome (Cr), steel (Fe), and nickel (Ni).

The second insulation layer 760 is disposed on the first metal layer 730 and the first insulating layer 720. The second insulation layer 760 may include silicon oxide (SiOx).

A gate electrode GE and a gate line (not shown) are disposed on the second insulation layer 760.

The gate insulation layer 770 is disposed on the second insulation layer 760 including the gate electrode GE and the gate line thereon The gate insulation layer 770 may include inorganic material, such as silicon nitride (SiNx) and/or silicon oxide (SiOx).

A channel layer CH overlapping with the gate electrode GE is disposed on the gate insulation layer 770.

The channel layer CH may include a semiconductor layer consisting of a-Si:H and an ohmic contact layer consisting of n+ a-Si:H. In addition or alternatively, the channel layer CH may include an oxide semiconductor. The oxide semiconductor may include an amorphous oxide including at least one selected from indium (In), zinc (Zn), gallium (Ga), tin (Sn), and hafnium (Hf). In one exemplary embodiment, the oxide semiconductor may consist of an amorphous oxide including indium (In), zinc (Zn), and gallium (Ga), or an amorphous oxide including indium (In), zinc (Zn), and hafnium (Hf). The oxide semiconductor may include an oxide such as indium zinc oxide (e.g., "InZnO"), indium gallium oxide (e.g., "InGaO"), indium tin oxide (e.g., "InSnO"), zinc tin oxide (e.g., "ZnSnO"), gallium tin oxide (e.g., "GaSnO"), and gallium zinc oxide (e.g., "GaZnO").

A source electrode SE and a drain electrode DE are disposed on the channel layer CH. The source electrode SE is electrically connected to a data line (not shown), and the train electrode DE is electrically connected to the first electrode EL1 through a contact hole CNT which extends through the protecting layer 780.

The gate electrode GE, the source electrode SE, the drain electrode DE and the channel layer CH form the thin film transistor TFT.

The protecting layer 780 is disposed on the thin film transistor TFT. The protecting layer 780 may include inorganic material such as silicon oxide (SiOx) and/or silicon nitride (SiNx). In addition, the protecting layer 780 may include organic insulating material having relatively low permittivity. In addition or alternatively, the protecting layer 780 may have a double layer structure of inorganic and organic insulating layers. The protecting layer 780 includes the contact hole CNT exposing a portion of the drain electrode DE.

The first electrode EL1 is disposed on the protecting layer 780. The first electrode EL1 is electrically connected to the drain electrode DE through the contact hole CNT. The first electrode EL1 may have a slit pattern having a plurality of openings. The first electrode EL1 may include a transparent conductive material, such as ITO, IZO and the like.

The opposite substrate includes a second substrate 800, a second antistatic layer 810, a third insulating layer 820, a second metal layer 830, a black matrix BM, a color filter CF, an over coating layer 860 and a second electrode EL2.

The second substrate 800 faces the first substrate 700. The substrate 800 may include a material which has relatively high transmittance, thermal resistance and chemical resistance. In one exemplary embodiment, for example the substrate 800 may include at least one selected from glass, polyethylenenaphthalate, Polyethylene terephthalate, and poly(methyl methacrylate).

The second antistatic layer 810 is disposed under the substrate 800. The second antistatic layer 810 may include conductive material which has a relatively high transmittance. The second antistatic layer 810 may include inorganic conductive material, conductive polymer, transparent conductive material and/or CNT. In one exemplary embodiment, for example, the second antistatic layer 810 may include PEDOT. In addition or alternatively, the second antistatic layer 810 may include ITO and/or IZO. A thickness of the second antistatic layer 810 may be about 10 Å to about 100 Å.

The third insulating layer 820 is disposed under the second antistatic layer 810. The third insulating layer 820 insulates elements on an inside of the display panel from the second antistatic layer 810. The third insulating layer 820 may include any of a number of organic materials. The third insulating layer 820 may have a sufficient thickness to insulate the inner elements of the display panel from the second antistatic layer 810. In one exemplary embodiment, for example, the thickness of the third insulating layer 820 may be about 1 μm to about 3 μm.

The second metal layer 830 is disposed under the third insulating layer 820. The second metal layer 830 includes a plurality of protrusion each having a first width. Adjacent protrusions are spaced apart from each other by a second width. The protrusions collectively form a wire grid pattern. The second metal layer 830 of the opposite substrate may be disposed only an area through which light passes.

The black matrix BM is also disposed under the third insulating layer 820. The black matrix BM corresponds to an area excluding the pixel area, and blocks light. Thus, the black matrix BM overlaps with the data line, the gate line and the thin film transistor TFT. The black matrix BM and the second metal layer 830 may include a same material and/or may be in a same layer of the opposite substrate of the display panel.

The color filter CF is disposed under the second metal layer 830. The color filter CF colors the light passing through the liquid crystal layer LC. The color filter CF may include a red color filter, a green color filter and blue color filter. The color filter CF corresponds to the pixel area. The display panel may include a plurality of pixel areas and a plurality of color filters CF. Adjacent color filters may have different colors. A color filter CF may be overlapped with an adjacent color filter CF in a boundary of the pixel area, or the color filter CF may be spaced apart from the adjacent color filter CF in the boundary of the pixel area.

The over coating layer 860 is disposed under the color filter CF and the black matrix BM. The over coating layer 860 planarizes, protects and insulates the color filter CF. The over coating layer 860 may include acrylic epoxy.

The second electrode EL2 corresponds to the pixel area, and is disposed between the over coating layer 860 and the liquid crystal layer LC. The second electrode EL2 may include a transparent conductive material, such as ITO, IZO and the like.

The liquid crystal layer LC is disposed between the array substrate and the opposite substrate. The liquid crystal layer LC includes liquid crystal molecules having optical anisotropy. The liquid crystal molecules are driven by electric field, so that an image is displayed by passing or blocking light through the liquid crystal layer LC.

Figure 8:
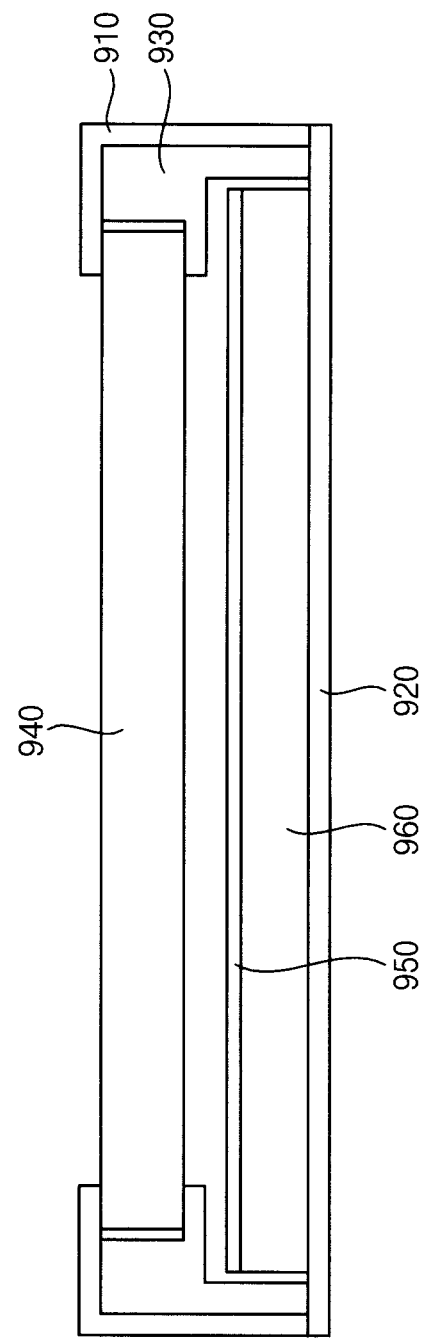
FIG. 8 is a cross-sectional view illustrating an exemplary embodiment of a display apparatus according to the invention.

FIG. 8 is a cross-sectional view illustrating an exemplary embodiment of a display apparatus according to the invention.

Referring to FIG. 8, the display apparatus includes a top chassis 910, a bottom chassis 920, a mold frame 930, a display panel 940, an optical element 950 and a backlight assembly 960.

The top chassis 910 and the bottom chassis 920 receive the mold frame 930, the display panel 940, the optical element 950 and the backlight assembly 960.

The display panel 940 may be substantially same as any one of the display panels of FIGS. 5 to 7. Thus, any further detailed descriptions concerning the same elements will be omitted.

The mold frame 930 supports the display panel 940, the optical element 950 and the backlight assembly 960. The display panel 940 is spaced apart from the optical element 950 and the backlight assembly 960 by the mold frame 930.

The optical element 950 is disposed under the display panel 940, and spaced apart from the display panel 940. The optical element 950 may increase uniformity of a brightness of light from the backlight assembly 960. The optical element 950 may include one or more optical sheets. In one exemplary embodiment, for example, the optical element 950 may include a protecting sheet, a prism sheet and a diffusion sheet, but is not limited thereto or thereby. In addition or alternatively, the optical element 950 may have variety of sheets.

Since the display panel 940 may include a first antistatic layer (refer to 310 of FIG. 5), static electricity from the display panel 940 may not inflow into a liquid crystal layer (refers to LC of FIG. 5). Thus, a spot on the display panel undesirably caused by the static electricity may be reduced or effectively prevented.

In addition, since the display panel 940 may include a second antistatic layer (refers to 610 of FIG. 6), static electricity from the display panel 940 may not inflow into a liquid crystal layer (refers to LC of FIG. 6). Thus, a spot on the display panel undesirably caused by the static electricity may be reduced or effectively prevented.

The backlight assembly 960 is disposed under the optical element 950. The backlight assembly 960 generates the light, and supplies the light to the display panel 940.

According to one or more exemplary embodiment of the invention, a polarizer includes an antistatic layer, so that inflow of static electricity into a display panel may be reduced or effectively prevented.

In addition, since the display panel includes the polarizer having the antistatic layer, inflow of static electricity into a liquid crystal layer caused from an optical element disposed under the display panel may be reduced or effectively prevented.

In addition, since an insulating layer having sufficient thickness is disposed on the antistatic layer, a coupling effect between a circuit pattern of the display panel and the antistatic layer may be reduced or effectively prevented.

Thus, since the display apparatus may include the display panel, a display quality is improved by reducing or effectively preventing a spot caused by static electricity.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A polarizer comprising:
 a substrate;
 an antistatic layer disposed on the substrate and comprising a conductive material; and
 a metal layer disposed on the antistatic layer and comprising a plurality of protrusions which form a wire grid pattern,
 wherein the metal layer comprises:
  a polarizing area including first wire grid pattern protrusions spaced apart from each other in a first direction and through which light passes, the first wire grid pattern protrusions spaced apart from each other by openings defined in the metal layer, and
  a reflecting area which reflects the light, the reflecting area including a second wire grid pattern protrusion for which no opening is defined in the metal layer, the second wire grid pattern protrusion disposed in a same layer as the polarizing area.

2. The polarizer of claim 1, wherein the antistatic layer comprises at least one selected from poly(3,4-ethylenedioxythiophene), indium tin oxide, indium zinc oxide, and a carbon nanotube.

3. The polarizer of claim 2, wherein a thickness of the antistatic layer is about 10 angstroms to about 100 angstroms.

4. The polarizer of claim 1, further comprising an insulating layer disposed between the antistatic layer and the metal layer.

5. The polarizer of claim 4, wherein a thickness of the insulating layer is about 1 micrometer to about 3 micrometers.

6. A display panel comprising:
an array substrate comprising:
  a first polarizer comprising:
    a first substrate,
    a first antistatic layer disposed on the first substrate and comprising a first conductive material, and
    a first metal layer disposed on the first antistatic layer and comprising a plurality of protrusions which form a first wire grid pattern,
    wherein the metal layer comprises:
      a polarizing area including first wire grid pattern protrusions spaced apart from each other in a first direction and through which light passes, the first wire grid pattern protrusions spaced apart from each other by openings defined in the metal layer, and
      a reflecting area which reflects the light, the reflecting area including a second wire grid pattern protrusion for which no opening is defined in the metal layer the second wire grid pattern protrusion disposed in a same layer as the polarizing area;
  a first insulating layer covering the first metal layer;
  a gate electrode disposed on the first insulating layer;
  a gate insulation layer disposed on the gate electrode;
  a channel layer disposed on the gate insulation layer;
  source and drain electrodes disposed on the channel layer;
  a protecting layer covering the source and drain electrodes, and comprising a contact hole exposing the drain electrode; and
  a first electrode disposed on the protecting layer and electrically connected to the drain electrode through the contact hole;
an opposite substrate facing the array substrate; and
a liquid crystal layer disposed between the array substrate and the opposite substrate.

7. The display panel of claim 6, wherein the opposite substrate comprises a second substrate, and a polarizing plate disposed on the second substrate.

8. The display panel of claim 6, wherein
the reflecting area overlaps a thin film transistor comprising the gate, source and drain electrodes.

9. The display panel of claim 6, wherein the array substrate further comprises a second insulating layer disposed between the first antistatic layer and the first metal layer.

10. The display panel of claim 6, wherein the opposite substrate comprises
  a second polarizer comprising:
    a second substrate;
    a second antistatic layer disposed under the second substrate and comprising a second conductive material; and
    a second metal layer disposed under the second antistatic layer and comprising a plurality of protrusions which form a second wire grid pattern;
  a third insulating layer between the second antistatic layer and the second metal layer; and
  a second electrode disposed under the third insulating layer.

11. The display panel of claim 10, wherein
the opposite substrate further comprises a black matrix disposed under the second substrate, and
the black matrix and the second metal layer are in a same layer of the opposite substrate.

12. A display apparatus comprising:
a display panel comprising an array substrate, an opposite substrate facing the array substrate and a liquid crystal layer disposed between the array substrate and the opposite substrate,
the array substrate of the display panel comprising:
  a first polarizer comprising:
    a first substrate,
    a first antistatic layer disposed on the first substrate and comprising a conductive material, and
    a first metal layer disposed on the first antistatic layer and comprising a plurality of protrusions which form a wire grid pattern,
    wherein the metal layer comprises:
      a polarizing area including first wire grid pattern protrusions spaced apart from each other in a first direction and through which light passes, the first wire grid pattern protrusions spaced apart from each other by openings defined in the metal layer, and
      a reflecting area which reflects the light, the reflecting area including a second wire grid pattern protrusion for which no opening is defined in the metal layer the second wire grid pattern protrusion disposed in a same layer as the polarizing area;
  a first insulating layer covering the first metal layer;
  a gate electrode disposed on the first insulating layer;
  a gate insulation layer disposed on the gate electrode;
  a channel layer disposed on the gate insulation layer;
  source and drain electrodes disposed on the channel layer;
  a protecting layer covering the source and drain electrodes, and comprising a contact hole exposing the drain electrode; and
  a first electrode disposed on the protecting layer and electrically connected to the drain electrode through the contact hole;
a backlight assembly disposed under the display panel and spaced apart from the display panel, wherein the backlight assembly supplies light to the display panel;
an optical element disposed between the display panel and the backlight assembly; and
a receiving container which receives the display panel, the backlight assembly and the optical element.

13. The display apparatus of claim 12, wherein the optical element is spaced apart from the display panel.

14. The display apparatus of claim 12, wherein the array substrate further comprises a second insulating layer disposed between the first antistatic layer and the first metal layer.

15. The display apparatus of claim 12, wherein the first antistatic layer comprises at least one selected from poly(3,4-ethylenedioxythiophene), indium tin oxide, indium zinc oxide, and a carbon nanotube.

* * * * *